May 27, 1924.
C. ARCIDIACONO
VEHICLE FENDER
Filed Jan. 21, 1924
1,495,835
3 Sheets-Sheet 1
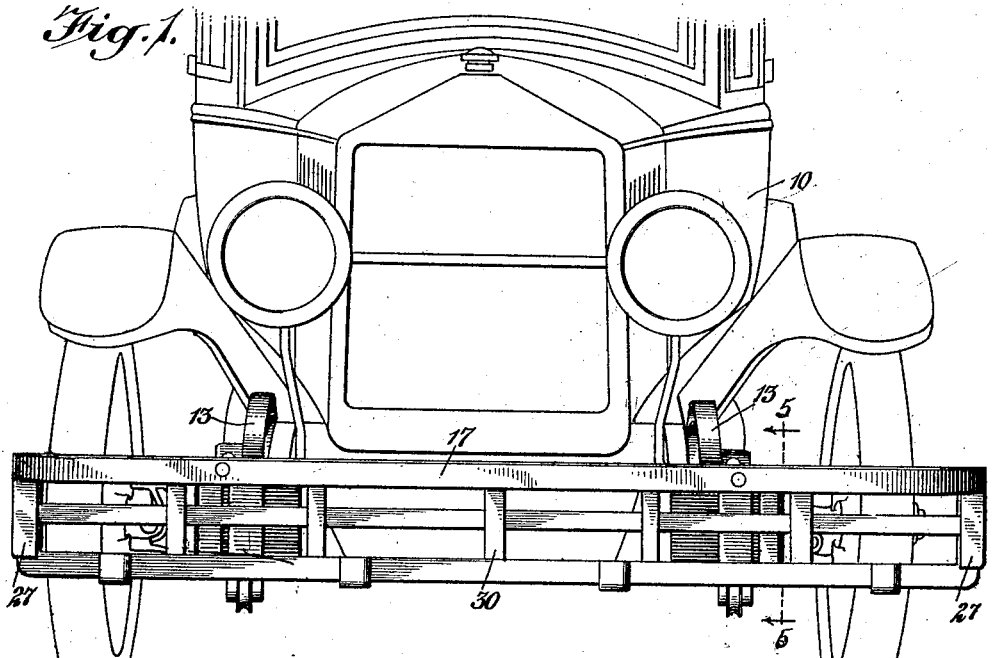
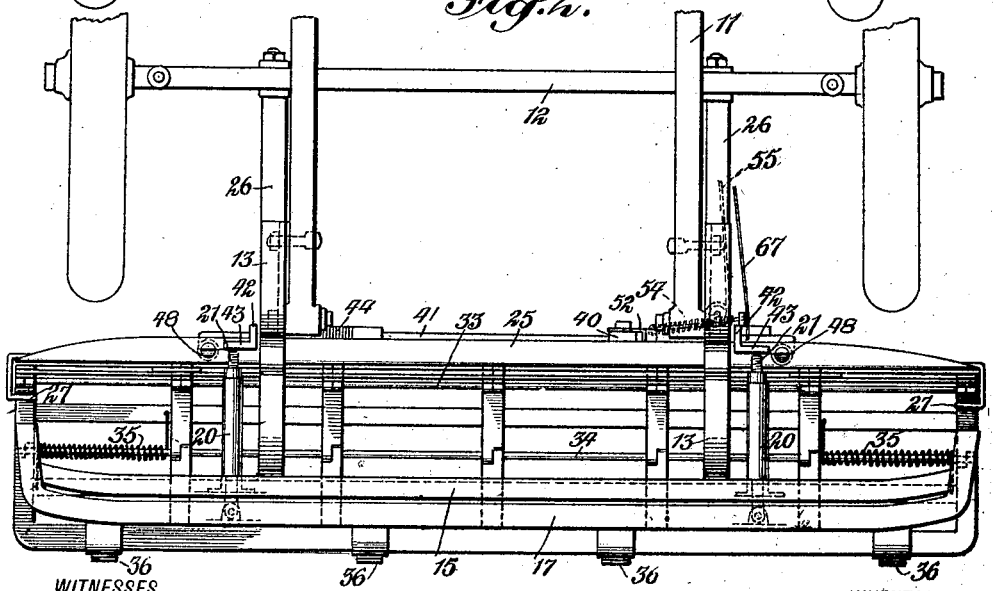
WITNESSES
INVENTOR
Concetto Arcidiacono
BY
ATTORNEYS

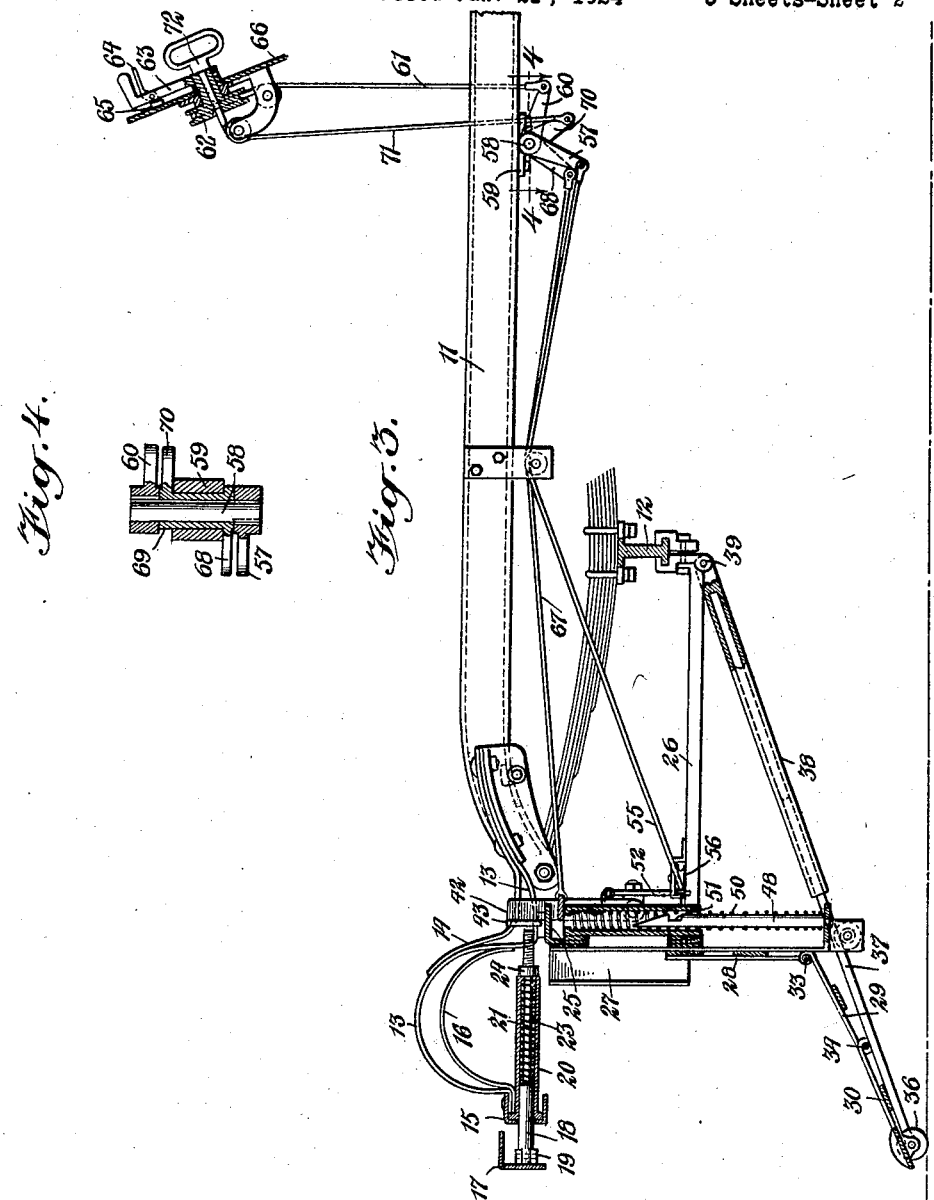

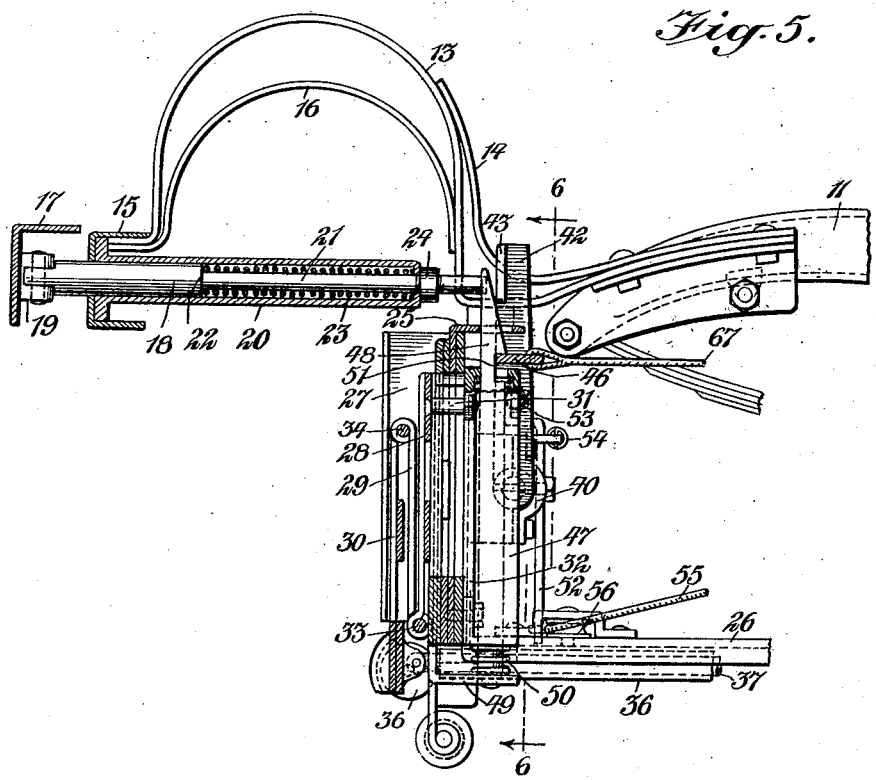

Patented May 27, 1924.

1,495,835

UNITED STATES PATENT OFFICE.

CONCETTO ARCIDIACONO, OF NEW YORK, N. Y.

VEHICLE FENDER.

Application filed January 21, 1924. Serial No. 687,648.

*To all whom it may concern:*

Be it known that I, CONCETTO ARCIDIACONO, a citizen of the United States, and a resident of the city of New York, borough of Manhattan, in the county and State of New York, have invented a new and Improved Vehicle Fender, of which the following is a full, clear, and exact description.

This invention relates to improvements in safety devices for vehicles and has particular reference to a fender especially adapted for use on motor vehicles.

An object of the invention is to provide an improved fender which, when applied to a vehicle, will not detract from the attractive appearance of the car and which will be instantly moved from its inoperative or normal position to its operative position upon a portion thereof coming in contact with an obstruction.

Another object is the provision of an apparatus of the above character which may also be manually operated from the driver's seat of the vehicle, or other convenient point remote from the fender.

A further object is to render the fender inoperative when in its normal position and the vehicle at a standstill so that contact with the fender will fail to effect an operation thereof.

The above and other objects will appear more clearly from the following detailed description, when taken in connection with the accompanying drawings, which illustrate a preferred embodiment of the inventive idea.

In the drawings—

Figure 1 is a fragmentary front elevation of a motor vehicle showing the fender thereof in inoperative or normal position and constructed in accordance with the invention;

Figure 2 is a top plan view showing the fender in its operated position;

Figure 3 is a fragmentary longitudinal section showing the fender in its operated position;

Figure 4 is a section on the line 4—4 of Figure 3;

Figure 5 is a fragmentary longitudinal sectional view on the line 5—5 of Figure 1 showing the fender in its normal or inoperative position; and Figure 6 is a section taken substantially on the line 6—6 of Figure 5.

The invention, which is capable of application to any form of vehicle, is shown in connection with a motor vehicle 10 of any known construction including the usual chassis 11 and front axle 12. Secured to the front ends of each of the side members of the chassis 11 are two forwardly extending resilient supporting members in the form of leaf springs 13 and 14, the latter of which bears against the former, as clearly shown in Figures 3 and 5. The member 13 is of greater length than the member 14 and bowed, as indicated, with its forward end secured to the stationary bumper member 15 which extends across the width of the vehicle forwardly of the front wheels thereof. Also secured to said bumper member 15 is another bowed resilient member 16 the free end of which engages the member 13 intermediate its ends and by the combination of the members 13, 14 and 16 it will be apparent that the bumper member 15 is securely supported in yieldable position. A relatively movable member 17 is associated with the member 15 and is supported by the member 15 through the intermediary of a rod 18 pivotally secured at 19 to the member 17 adjacent each end thereof and extending into the sleeve 20 carried by the member 15 and projecting rearwardly therefrom. Each rod 18 is slidably mounted in the sleeve 20 and has a portion 21 thereof reduced to form a shoulder 22 between which and the rear end of the sleeve 20 is interposed a spring 23 coiled about the rod 21 and normally exerting a pressure upon the rod 18 to force the same outwardly or forwardly so as to space the member 17 in front of the member 15. The rear end of the rod 18 projects through the adjacent end of the sleeve for a purpose which will presently appear and is provided thereon with an enlargement 24 normally engageable with the adjacent end of the sleeve to limit the outward movement of the bumper member 17. It will be obvious from this construction that should the member 17 come in contact with an obstruction the same will be forced inwardly or rearwardly against the tension of the spring 23 and this movement of the bumper member is imparted to either or both of the rods 18 to effect the automatic operation of the fender in a manner to appear in the course of the description.

The fender proper comprises an upper frame, generally indicated by the numeral 25, which is supported by attachment to the members 13 and also by braces 26 extending rearwardly from the lower portion of the frame and connected in any suitable manner to the axle 12. Formed at each end of the frame 25 are forwardly extending flanges 27 which are bent to provide guides for receiving therebetween the movable sections 28, 29 and 30 of the fender. The section 28 is mounted for vertical movement between the guides 27 and is guided in such vertical movement by pins 31 (Figure 6) carried by said section and engageable in vertically slotted plates 32 forming a part of the stationary frame 25, the movement of said section 28 being limited by engagement of the pins 31 with the ends of the slots in said plates. The lower portion of the vertically movable section is pivotally connected by a rod 33 to the next adjacent or intermediate section 29, which is in turn pivoted by a rod 34 to the adjacent edge of the lowermost section 30. Coiled about the rod 34 at each end thereof is a spring 35 one end of which is connected to the section 29 while the other is connected to the section 30 so as to be instrumental in extending said sections to the operated position shown in Figures 2 and 3 when the fender is released from its normal position. The lowermost edge of the section 30 is provided with a plurality of rollers 36 adapted to contact the ground when the fender is in its operated position so as to form a suitable bearing for the section 30 when the vehicle is in motion. When in operative position the sections 29 and 30 are supported by means of rods 37 pivotally connected at their forward ends to the forward edge of the section 30, the rear ends of said rods telescoping into sleeves 38 pivotally connected at 39 to the rear extremities of the braces 26. When the fender is in its normal position the sleeves 38 engage and are partially nested in the braces 26, as indicated in dotted lines in Figure 5. However, when the fender sections are released and moved downwardly as a unit with respect to the frame 25 and between the guides 27 the sleeves 38 are swung about their pivots 39 and when the rod 34, which joins the sections 29 and 30, has cleared the lower ends of the guides 27 the springs 35 then act to throw the sections outwardly and downwardly to the operative position shown in Figure 3. During these forward and downward movements the rods 37 slide longitudinally in the sleeves 38 to the position shown in said figure, whereupon the rod 34 and other portions of the sections 29 and 30 will contact with said rods and be supported and braced thereby.

The mechanism for supporting the fender in its normal or inoperative position and for controlling and for effecting the release of said fender to permit of its movement to operative position as above referred to will now be described. Carried by the frame 25 are suitable bearings 40 (Figures 5 and 6) in which is mounted an oscillatory sleeve 41 the ends of which carry trip members 42. The upper end of each member 42 is provided with a laterally extending flange 43 arranged in the path of rearward movement of the adjacent rod 21 so that when either or both of the rods 21 are forced rearwardly by contact of the bumper member 17 with an obstruction the rear end of each rod will contact its associated flange 43 and thereby rock the trip members 42 and the sleeve 41 in the bearings 40. This rocking movement is made against the tension of springs 44 coiled about the sleeve 41 and engaged with said sleeve and the bearings 40 in such manner that the springs will restore the sleeve to its normal position when pressure upon the trip members is relieved. Extending through the sleeve 41 and projecting beyond the ends thereof is a shaft 45 which normally is oscillated with the sleeve 41 through the intermediary of a mechanism which will presently be described and which carries upon each end thereof a latching arm 46 designed to support the sections of the fender in their inoperative positions within the confines of the guides 27, as illustrated in Figure 5. To this end the frame 25 carries a vertically arranged sleeve 47 adjacent each of the arms 46 in which is slidably mounted a locking pin 48 the lower end of which is secured to a supporting flange 49 forming a part of the section 28 of the fender. Interposed between the upper end of the sleeve 47 and the flange 49 and coiled about the locking pin 48 is a spring 50 which is placed under tension when the parts are in normal position so as to exert a constant downward pressure upon the flange 49 and consequently the section 28 of the fender. However, with the parts in their normal position each latching arm 46 engages in a notch 51 in the pin 48 so that the sections of the fender are maintained in an elevated position.

As previously referred to, the sleeve 41 and shaft 45 and consequently the trip members 42 and the latching arms 46 normally oscillate in unison and in order to accomplish this purpose the sleeve 41 adjacent one end thereof has pivoted thereto intermediate its ends a lever 52, to one end of which is pivoted a pin 53 (Figure 6). This pin normally projects through openings formed in one of the trip members 42 and adjacent latching arm 46 and is yieldably maintained in such position by a coil spring 54 one end of which is connected to said trip member 42 and the other end to the lever 52. From this construction it will be obvious that when the flange 43 of either of the trip members is engaged by the rear end of the rod 21, both trip members and the latching arms together with the sleeve 41 and shaft 45 will be rocked, thereby disengaging the latching arms 46 from the notches 51 in the pins 48. Thereupon the springs 50 will exert a downward pressure upon the flange 49 with the result that the sections of the fender will be lowered and as soon as the rod 34 connecting the sections 29 and 30 has cleared the lower ends of the guides 27 the springs 35 will operate to extend the intermediate and lower sections 29 and 30 to the operative position shown in Figure 3.

Should it be desired to render the apparatus inoperative, as for instance when the car is at a standstill, the lever 52 may be rocked about its pivot to withdraw the pin 53 from engagement with the latching arm 46. When thus withdrawn, should the bumper member 17 be struck and either or both of the rods 21 forced rearwardly the associated trip member 42 will be rocked, but this rocking will not now be imparted to either of the latching arms 46 which will remain in engagement with the locking pins 48 and thus maintain the sections of the fender in their inoperative positions. To accomplish the rocking of the lever 52 against the tension of the spring 54 a flexible element 55 has one end connected to the end of the lever 52 opposite to that to which the pin 53 is connected and this flexible element is passed around a suitable pulley 56 and extended rearwardly with its rear end connected to an arm 57 keyed to a stub shaft 58 mounted in a suitable bearing 59 supported from the chassis 11. A second arm 60 is also keyed to the shaft 58 and has one end of a flexible connection 61 secured thereto, which connection is extended about a rotatable pulley 62 suitably supported upon the dashboard of the vehicle. The pulley 62 is rotated by means of a handle 63 to wind the flexible element 61 on to said pulley and thereby impart a pull to the flexible element 55 which will withdraw the pin 53 from engagement with the latching arm 46. To maintain the parts in this position the handle 63 carries a small pawl 64 which engages with teeth 65 formed upon a plate 66 or other suitable surface. By releasing the pawl 64 from engagement with the teeth 65 the parts will be permitted to restore to normal position under the influence of the coil spring 54.

The invention further provides means whereby the release of the fender to permit of its movement to an operative position may be manually controlled. This means preferably includes a flexible element 67, one end of which is connected to one of the latching arms 46 (Figures 3 and 5) and which is extended rearwardly therefrom and connected to an arm 68 carried by a sleeve 69 which is rotatably supported upon the shaft 58. This sleeve 69 also carries a second arm 70 to which is secured one end of a flexible connection 71, the other end of which is connected to a handle 72, a portion of which extends through the pulley 62. When a pull is exerted upon the handle 72 this movement is imparted to the latching arm 46 to which the flexible connection 67 is connected and inasmuch as the trip members 42 and arms 46 are locked together by the pin 53 it will be obvious that the arms 46 will be withdrawn from engagement with the pins 48 thus permitting the sections of the fender to move downwardly to their operative positions.

What is claimed is:

1. In a fender for vehicles, a plurality of fender sections normally supported in a folded inoperative position, a locking element carried by one of said sections, a latching member normally engaged with said locking element to maintain said sections in their inoperative positions, a trip member normally coupled with said latching member, and means engageable with said trip member to cause the same to actuate said latching member to disengage the latter from said locking element to permit said sections to be extended to their operative positions.

2. In a fender for vehicles, a plurality of fender sections normally supported in a folded inoperative position, a locking element carried by one of said sections, a latching member normally engaged with said locking element to maintain said sections in their inoperative positions, a trip member normally coupled with said latching member, means engageable with said trip member to cause the same to actuate said latching member to disengage the latter from said locking element to permit said sections to be extended to their operative positions, and means for uncoupling said latching and trip members to render the last-named means ineffective to actuate said latching member.

3. In a fender for vehicles, a plurality of fender sections normally supported in a folded inoperative position, a locking element carried by one of said sections, a latching member normally engaged with said locking element to maintain said sections in their inoperative positions, a trip member normally coupled with said latching member, a bumper element, and means actuated by engagement of said bumper element with an obstruction to operate said trip and latching members to disengage the latter from said locking element to permit said sections to be extended to their operative positions.

4. In a fender for vehicles, a plurality of fender sections normally supported in a folded inoperative position, a locking element carried by one of said sections, a latching member normally engaged with said locking element to maintain said sections in their inoperative positions, a trip member normally coupled with said latching member, a bumper element, means actuated by engagement of said bumper element with an obstruction to operate said trip and latching members to disengage the latter from said locking element to permit said sections to be extended to their operative positions, and manually controlled means permitting of an operation of said latching member independent of the last-named means.

5. In a fender for vehicles, a plurality of fender sections normally supported in a folded inoperative position, a locking element carried by one of said sections, a latching member normally engaged with said locking element to maintain said sections in their inoperative positions, a trip member normally coupled with said latching member, means engageable with said trip member to cause the same to actuate said latching member to disengage the latter from said locking element to permit said sections to be extended to their operative positions, a pin projecting through said trip and latching members to couple the same together whereby said latching member is actuated when said trip member is engaged by the last-named means, and manually controlled means for withdrawing said pin from said latching member to prevent operation thereof when the trip member is actuated.

6. In a fender for vehicles, a frame having guides, a plurality of hingedly connected fender sections supported in a folded inoperative position between said guides and having a sliding movement with respect to said frame when moving to an operative position, a locking element supported by one of said fender sections, a latching member engageable with said locking element to support said sections in their inoperative positions, and means operated by contact with an obstruction for actuating said latching member to disengage the same from said locking element to permit said sections to be extended to their operative positions.

7. In a fender for vehicles, a frame having guides, a plurality of hingedly connected fender sections supported in a folded inoperative position between said guides and having a sliding movement with respect to said frame when moving to an operative position, a locking element supported by one of said fender sections, a latching member engageable with said locking element to support said sections in their inoperative positions, means for actuating said latching member to disengage the same from said locking element to permit said sections to be extended to their operative positions, and resilient means operable when said latching member is actuated to cause said sections to be moved relative to said frame to their extended positions.

8. In a fender for vehicles, a frame, a plurality of hingedly connected fender sections normally supported in a folded inoperative position on said frame and initially movable as a unit with respect to said frame when being extended to their operative positions, certain of said sections thereafter having relative movements with respect to another section to complete the extension of the sections to their operative positions, means for retaining said sections in their inoperative positions, and means operated by contact with an obstruction for releasing the last-named means.

9. In a fender for vehicles, a frame, a plurality of hingedly connected fender sections normally supported in a folded inoperative position on said frame and initially movable as a unit with respect to said frame when being extended to their operative positions, certain of said sections thereafter having relative movements with respect to another section to complete the extension of the sections to their operative positions, a locking element carried by one of said sections, a latching member engageable with said locking element to support said sections in their inoperative positions, a bumper element, and a trip mechanism actuated when said bumper element strikes an obstruction to disengage said latching member from said locking element to permit of said sections being extended to their operative positions.

10. In a fender for vehicles, a frame, a plurality of hingedly connected fender sections normally supported in a folded inoperative position on said frame and initially movable as a unit with respect to said frame when being extended to their operative positions, certain of said sections thereafter having relative movements with respect to another section to complete the extension of the sections to their operative positions, a locking element carried by one of said sections, a latching member engageable with said locking element to support said sections in their inoperative positions, a bumper element, a trip mechanism actuated when said bumper element strikes an obstruction to disengage said latching member from said locking element to permit of said sections being extended to their operative positions, and guiding and supporting means for the sections having relative movements with respect to said other section when said sections are moving to their operative positions.

CONCETTO ARCIDIACONO.